United States Patent [19]

Euler

[11] Patent Number: 4,550,817
[45] Date of Patent: Nov. 5, 1985

[54] MECHANICAL CLUTCH

[75] Inventor: John W. Euler, Benton Harbor, Mich.

[73] Assignee: Lambert Brake Corporation, St. Joseph, Mich.

[21] Appl. No.: 585,248

[22] Filed: Feb. 29, 1984

[51] Int. Cl.[4] .................. F16D 13/42; F16D 15/00
[52] U.S. Cl. ......................... 192/70.23; 192/93 C
[58] Field of Search ............ 192/70.23, 70.25, 93 R, 192/93 C

[56] References Cited

U.S. PATENT DOCUMENTS

| | | | |
|---|---|---|---|
| 2,185,714 | 1/1940 | Scherer | 192/93 C |
| 2,244,169 | 6/1941 | Miller | 192/70.23 |
| 2,495,988 | 1/1950 | Sheppard | 74/389 |
| 2,506,713 | 5/1950 | Fast | 192/93 C |
| 2,639,013 | 5/1953 | Meschia | 192/93 C |
| 2,702,107 | 2/1955 | Hann | 192/93 C |
| 2,766,864 | 10/1956 | Schilling et al. | 192/85 |
| 2,837,192 | 6/1958 | Dunkelow | 192/85 |
| 3,176,811 | 4/1965 | Smith | 192/93 C |
| 3,335,836 | 8/1967 | Swanson | 192/85 |
| 4,226,318 | 10/1980 | Morgan | 192/85 CA |
| 4,226,319 | 10/1980 | Euler et al. | 192/85 CA |

Primary Examiner—Alan Cohan
Assistant Examiner—John A. Rivell
Attorney, Agent, or Firm—Trexler, Bushnell & Wolters, Ltd.

[57] ABSTRACT

A mechanical, non-fluid-power clutch is disclosed. Inside a clutch housing, a cup element is fixed to a first shaft. First splined discs radiate inwardly from the cup. A second shaft, coaxial with the first shaft, has a second set of splined discs which radiate outwardly in an interleaved arrangement with the first discs, so as to form a disc stack. A collar cam is also carried by the cup element. This collar cam has a fixed element, and a movable element which can squeeze the disc stack and consequently couple the shafts. Interconnector balls move radially outwardly between the collar cam elements to effect the collar cam element movement and shaft coupling. The radially outward movement of the balls is caused by a sleeve cam telescoped upon the second shaft. The sleeve cam can be moved axially by a yoke arrangement, which is controlled by a lever located outside the housing.

19 Claims, 5 Drawing Figures

MECHANICAL CLUTCH

BACKGROUND OF THE INVENTION

Clutch mechanisms find wide use in power drive trains and in other modern industrial mechanisms. Many of these clutches use hydraulic fluid and pressure to actuate or de-actuate the clutching mechanism. One such clutch which has met with considerable commercial success is described and claimed in U.S. Pat. No. 4,226,319 to Euler and Pear.

However, many vehicles and other mechanisms are not provided with sources of hydraulic power. Non-hydraulic, strictly mechanical clutches are required in these services.

It is accordingly the general object of the present invention to provide a clutch unit which is effective and powerful in operation, yet which does not require hydraulic fluid or hydraulic pressure for its operation.

Another object is to provide a non-hydraulic clutch unit which is compact in its overall dimensions, yet which effectively transfers large amounts of torque or mechanical energy without slipage.

Another object is to provide such a non-hydraulic clutch which is reliable and rugged in design and manufacture, yet which can be offered at a commercially attractive price.

Other objects and advantages of the invention will become apparent upon reading the following detailed description and upon reference to the drawings. Throughout the drawings, like reference numerals refer to like parts.

DETAILED DESCRIPTION

While the invention will be described in connection with a preferred embodiment, it will be understood that it is not intended to limit the invention to this embodiment. On the contrary, it is intended to cover all alternatives, modifications and equivalents as may be included within the spirit and scope of the invention as defined by the appended claims.

Figure 1:
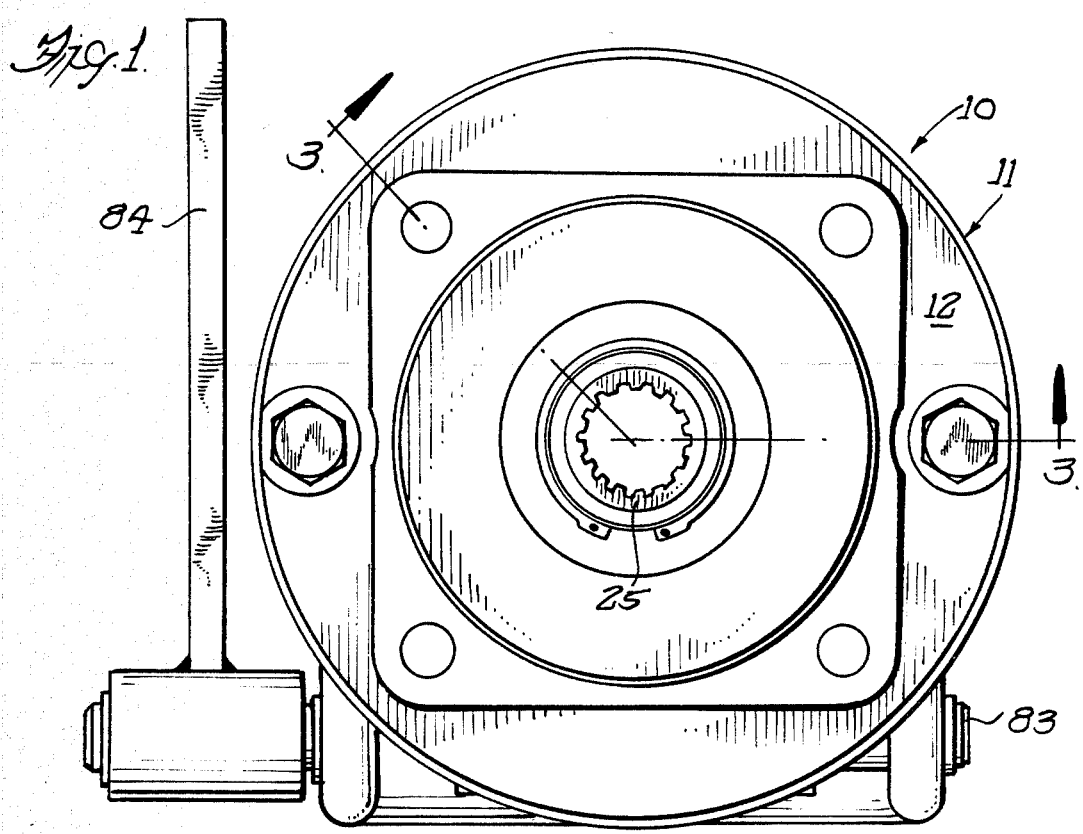
FIG. 1 is an end elevational view of the novel clutch.
Figure 2:
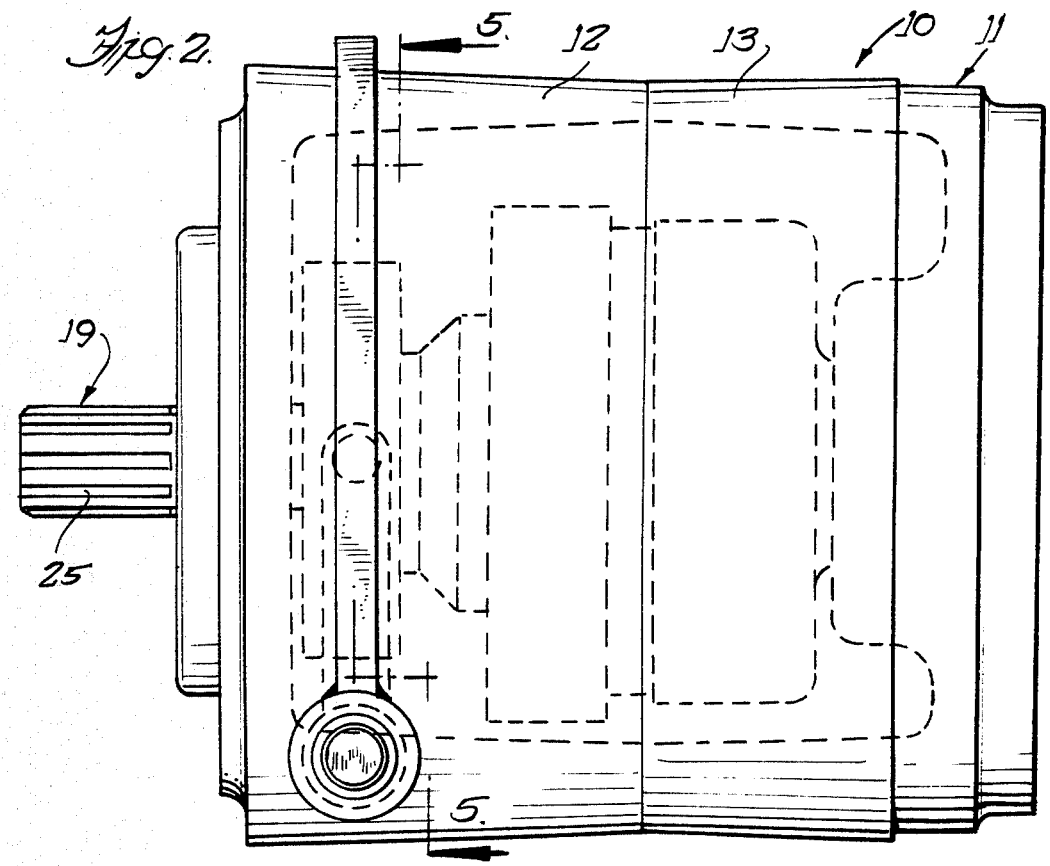
FIG. 2 is a side elevational view of the clutch.
Figure 3:
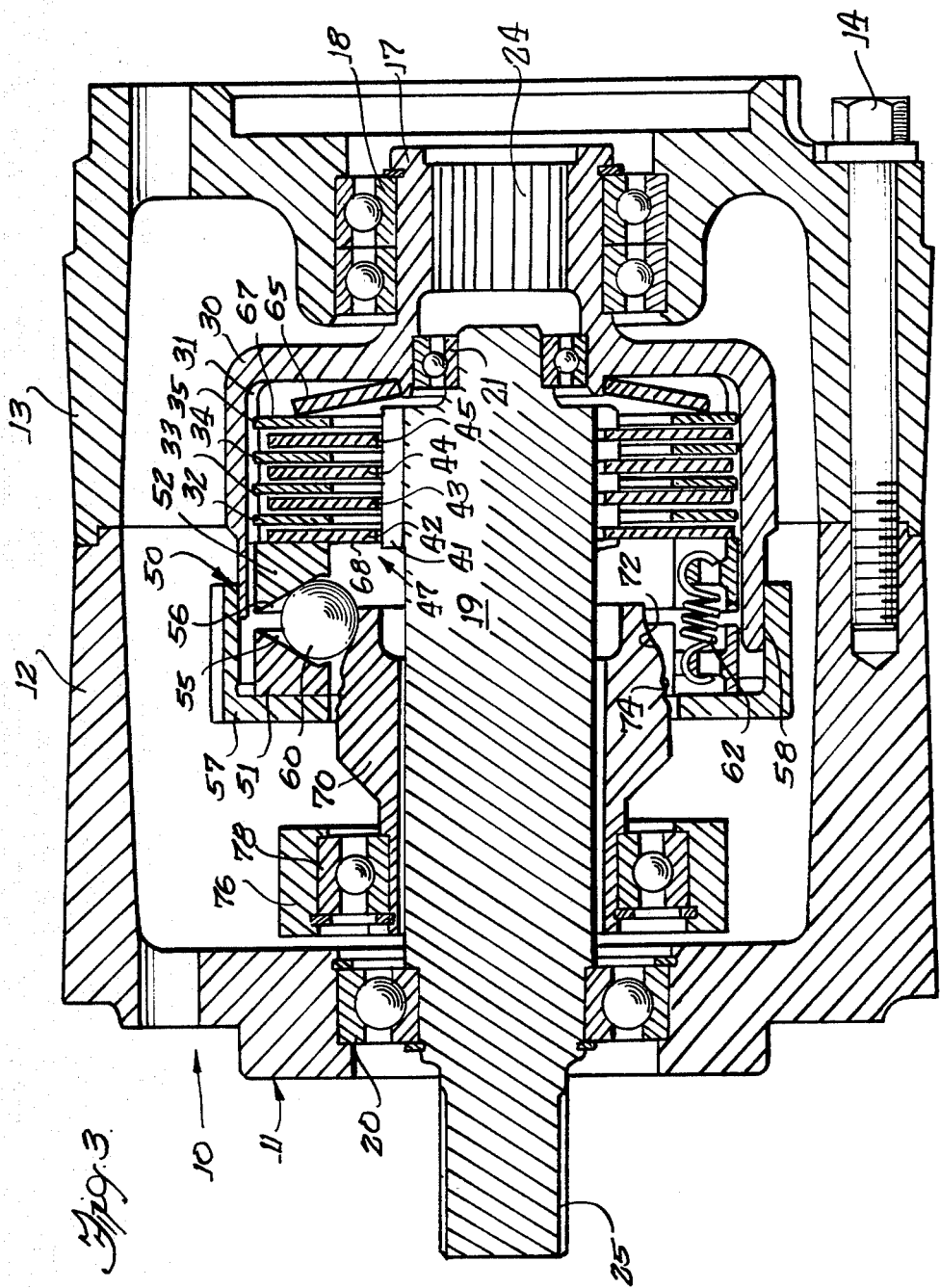
FIG. 3 is a sectional view taken substantially in the planes of the lines 3—3 in FIG. 1; and showing the clutch in its shafts-disengaged condition.

Turning more particularly to FIGS. 1-3, there is shown a clutch 10 embodying the present invention. It will be understood that this is a strictly mechanical clutch; that is, no hydraulic or other fluid power systems of any kind are required for its operation. The clutch illustrated includes a housing 11 which comprises generally opposed housing halves 12 and 13 connected to one another by any convenient arrangement such as a series of bolts 14. A first shaft member 17 is journaled in the housing 11, as by bearings 18, and a second or output shaft 19 is here carried at least partly inside the housing 11 in coaxial relationship with the firt shaft 17, as illustrated. A bearing 20 journals this second shaft 19 within the housing 11, and another bearing 21 is interposed between the shaft members 17 and 19 to permit the shafts 17, 19 to rotate freely with respect to one another. This first shaft 17 is provided with a series of female or internal splines 24, and the second shaft 19 is provided with male splines 25 to permit the shafts to be attached to other power train mechanisms such as speed reducers, prime movers, or the like (not shown).

Integral with the first shaft 17 is a cup member or element 30. The interior of this cup element 30 is provided with splines, and a series of first discs 32–35 extend radially inwardly from the shaft cup 30. The spline interconnection 31 permits the first discs 32–35 to rotate with the first shaft 17, and permits those discs limited axial motion over and within the cup 30.

Figure 4:
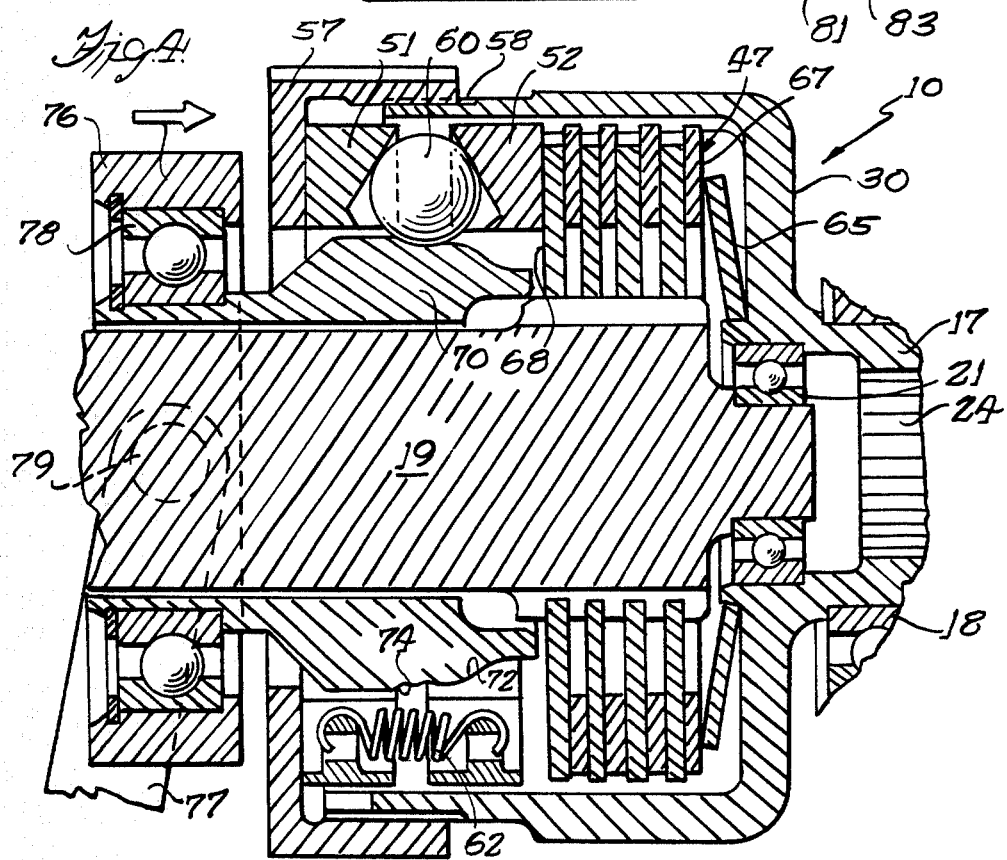
FIG. 4 is a fragmentary sectional view similar to FIG. 3 but showing the clutch in its shafts-engaged condition.

Interleaved in the first discs 32–35 is a set of second discs 42–45. These second discs 42–45 are splined, as by spline connections 41, to the second shaft 19. The second discs 42–45 radiate outwardly from the shaft 19, and thus form a disc stack 47 with the first discs 32–35. It will be understood that when the disc stack 47 is axially compressed and the discs interengage as shown in FIG. 4, the first shaft 17 and its cup 30 are caused to rotate with the second shaft 19 in a shafts-engaged configuration.

To mechanically squeeze together the discs of the disc stack 47 and couple the shafts 17 and 19 in accordance with the invention, a collar cam structure 50 is provided. Here, this collar cam means 50 includes an axially fixed element 51 and an axially movable element 52. Facing cam surfaces 55, 56 together describe a series of substantially v-shaped grooves which act as ball ramps, as shown especially in FIGS. 3 and 4.

The position of the fixed element 51 can be adjusted in an axial direction along the shaft 19, because that fixed element 51 is connected, as by the spline connection 31, to a ring member 57, and the ring member 57 is attached, as by a threaded interconnection 58, to the cup element 30 of the firt shaft 17. The threaded attachment 58 has an axis substantially coincident with one or both of the main clutch shafts 17, 19, so as to permit the position of the collar cam fixed element 51 to be adjusted along the axis of the shaft. This thread arrangement permits clutch operation to be adjusted after assembly. It will be understood, of course, that the shafts 17, 19 and the interconnected cup 30 do not move axially during shaft rotation or clutch operation.

Interposed between the collar cam elements 51, 52 are a series of interconnector balls 60. When these balls 60 are moved radially outwardly from the position shown in FIG. 3 to that shown in FIG. 4, the collar cam element 52 is urged in a first direction (to the right, in the illustrations) away from the fixed cam element 51 so as to axially compress the discs of the disc stack 47. This disc stack compression and disc interengagement causes the shafts 17 and 19 to be interconnected for rotation with one another.

When, however, the ball elements 60 move from the position shown in FIG. 4 radially inwardly to the position shown in FIG. 3, the disc stack 47 is released and the shafts 17, 19 are permitted to rotate freely with respect to one another. Tension springs 62 connected between the first and second collar cam elements 51, 52 urge those elements to rotate or otherwise move so as to bring the cam surfaces 55, 56 back into registry with one another. This action permits other clutch parts to move or re-adjust themselves so as to provide running clearances within the clutch unit.

In carrying out the invention, uniform compressive loading of the disc stack 47 is encouraged. In the illustrated embodiment, this is provided by a spring disc or tinnerman washer 65 interposed between the cup element 30 and the disc stack 47. It will be understood, of course, that it is most convenient to locate this disc spring 65 at an end 67 of the disc stack 47 which is opposite that end 68 abutted by the movable cam element 52.

In furtherance of the invention, radially outward motion of the interconnector balls 60 is caused by a sleeve cam 70, which is here telescoped over the second shaft 19. As illustrated particularly in FIGS. 3 and 4, this sleeve cam 70 includes a conical ramp cam surface 72 which engages the interconnector balls 60 and forces them radially outwardly of the sleeve cam 70 between the fixed and movable collar cam elements 51, 52. The conical ramp cam surface 72 terminates in a detent 74 which operates to retain the interconnector balls 60 in positions such that the movable cam element 52 squeezes the disc stack 47 into a shafts-coupled condition, as illustrated in FIG. 4.

A yoke 76 is provided to move the sleeve cam 70 in its axial direction over the shaft 19 and consequently couple or uncouple the shafts. This yoke 76 does not rotate, but, as explained above, the sleeve cam 70 does turn when the clutch is in its shafts-coupled condition, FIG. 4. Consequently, a bearing 78 is provided to make a low-friction interconnection between the yoke 76 and the sleeve cam 70.

Figure 5:
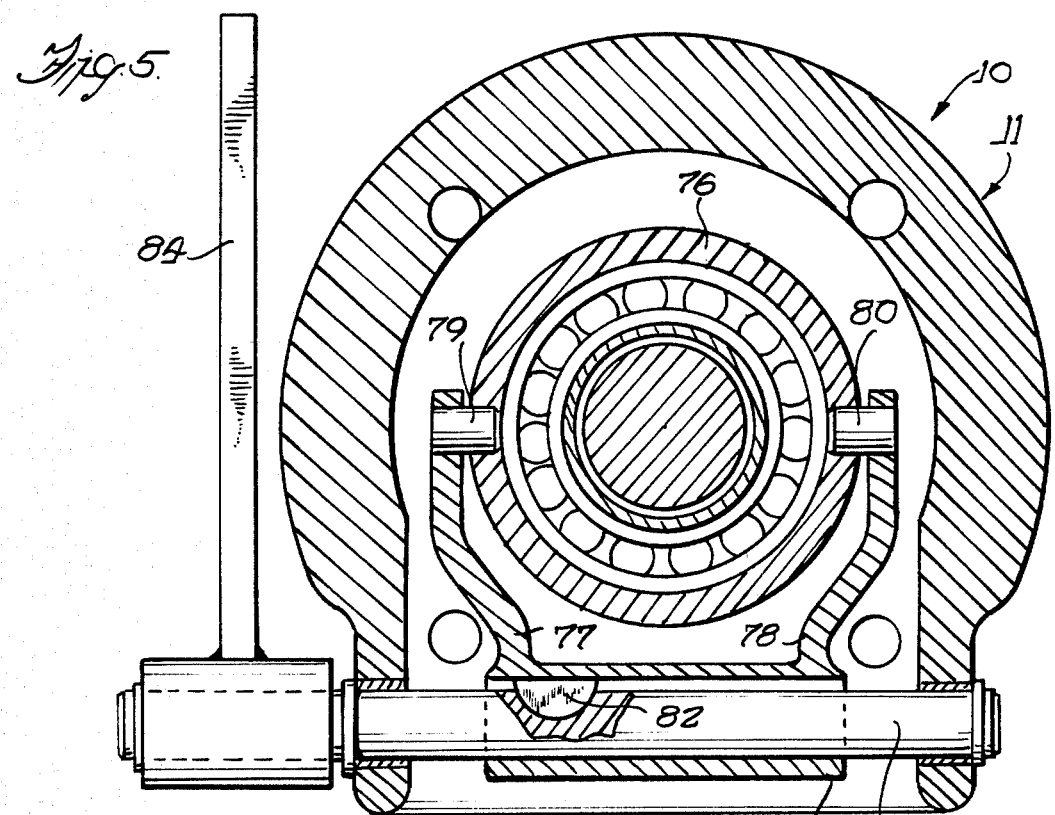
FIG. 5 is a sectional view taken substantially in the planes of line 5—5 in FIG. 2.

Axial motion of the yoke 76 is caused by the yoke arms 77, 78 and the pin interconnectors 79, 80 shown in FIG. 5. As illustrated there, the arms 77, 78 are formed integrally with a base 81, and that base 81 is affixed, as by a key 82, to a cross-shaft 83. The cross-shaft 83 extends outside the housing 11 and is secured to a lever 84. Thus, when the lever 84 is moved into the appropriate position, that lever motion is transferred to the yoke collar 76. The yoke collar 76 moves the sleeve cam 70 so as to force the interconnector balls 60 into positions to squeeze the disc stack 47 and couple the shafts 17, 19.

The invention is claimed as follows:

1. A mechanical clutch comprising, in combination, a first shaft, a cup element fixed to the first shaft, first discs radiating inwardly from the first shaft and mounted for rotation with the first shaft and for limited axial movement therealong, a second shaft coaxial with the first shaft, second discs radiating outwardly from the second shaft and interleaved with the first discs to form a disc stack, collar cam means carried by the cup element and including a collar cam movable element movable in a first direction to squeeze the disc stack and couple the shafts and movable in a second direction to release the disc stack and permit the shafts to rotate freely of one another, a collar cam fixed element, interconnector means interposed between said collar cam fixed and movable elements for urging the movable collar cam element in said first direction, ring means carrying said collar cam fixed element, and threaded attachment means for attaching said ring means to said cup element, the threaded attachment means having an axis substantially coincident with a clutch shaft so as to permit the position of the collar cam fixed element to be adjusted along the axis of said shaft.

2. A clutch according to claim 1 further including biasing means for urging the movable collar cam element into registry with said fixed element to provide running clearance for the clutch parts.

3. A clutch according to claim 1 further including spring disc means interposed between the disc stack and the housing to encourage uniform compressive loading of the disc stack.

4. A clutch according to claim 1 further including selectively movable sleeve cam means for urging the interconnector means between the fixed and movable collar cam elements, and consequently moving the movable cam element in said first direction.

5. A clutch according to claim 4 wherein said sleeve cam means includes detent means for retaining the interconnector means in such a position that the movable cam element squeezes the disc stack into a shafts-coupled condition.

6. A clutch according to claim 4 wherein said sleeve cam means further includes a conical ramp cam surface for engaging the interconnector means and forcing the interconnector means radially outwardly of the sleeve cam means between the fixed and movable collar cam elements.

7. A clutch according to claim 4 wherein said sleeve cam is adapted to fit over one of said shafts for axial movement therealong.

8. A clutch according to claim 4 further including yoke means for moving said sleeve cam means so as to consequently couple or uncouple said first and second shafts.

9. A clutch according to claim 8 further including actuator lever means connected to said yoke means for moving said yoke means and said sleeve cam means.

10. A clutch comprising, in combination, an input shaft, driving discs radiating from the input shaft, an output shaft, driven discs radiating from the output shaft and interleaved with the driving discs to form a disc stack, mechanical, non-fluid power actuator means for applying sufficient axial pressure to the driving and driven discs in the disc stack to couple them and thereby couple the input and output shafts, said mechanical actuator means including sleeve cam means, collar cam means engageable with said disc pack, and interconnector means interconnecting the sleeve cam means and collar cam means, said collar cam means acting to squeeze the disc stack and consequently couple the shafts when the sleeve cam and interconnector means are in coupling position and the collar cam means acting to release the disc stack and consequently uncouple the shafts when the sleeve cam and the interconnector means are in uncoupling positions, said collar cam means comprising an axially fixed element and an axially movable element, said collar cam elements having facing cam surfaces for engaging said interconnector means, and ring means for mounting said collar cam fixed element in a given but adjustable position relative to said shafts and said sleeve cam means.

11. A clutch according to claim 10 further including spring disc means interposed between the clutch housing and the disc stack to encourage uniform compressive loading of the disc stack.

12. A clutch according to claim 10 wherein said sleeve cam means includes a conical ramp surface for engaging said interconnector means.

13. A clutch according to claim 10 wherein one of said cam means includes detent means for retaining said interconnector means in such a position as to cause the cam means and said shafts to be located in the shafts-coupled positions.

14. A clutch according to claim 10 wherein said facing cam surfaces include a series of substantially V-shaped grooves.

15. A clutch according to claim 10 further including biasing means for urging said movable cam element toward said fixed cam element.

16. A clutch according to claim 10 further including threaded adjustment means interconnecting said ring means and at least one of said shafts for permitting said ring means and the associated fixed collar cam element to be adjustably moved in an axial direction relative to said shafts.

17. A clutch according to claim 10 wherein said interconnector means includes a plurality of ball elements interposed between said sleeve cam means and said collar cam means.

18. A clutch according to claim 10 further including yoke means attached to said sleeve cam means for moving said sleeve cam means axially along at least one of said shafts.

19. A clutch according to claim 18 further including actuator lever means located outside a clutch housing for moving said yoke means and, consequently, said sleeve cam means.

* * * * *